United States Patent Office

3,208,963
Patented Sept. 28, 1965

---

3,208,963
NOVEL TERPOLYMERS
Victor Jasinski, North Plainfield, N.J., assignor to National Starch and Chemical Corporation, New York, N.Y., a corporation of Delaware
No Drawing. Filed Jan. 25, 1962, Ser. No. 173,852
15 Claims. (Cl. 260—29.6)

This invention relates to a novel method for copolymerizing vinyl acetate and hydroxyalkyl acrylates, as well as the copolymers thereby prepared.

It is the prime object of this invention to provide a method for homogeneously copolymerizing vinyl acetate and lower hydroxyalkyl acrylates. A further object is the preparation of vinyl acetate: hydroxyalkyl acrylate copolymer lacquers characterized by their clarity and absence of discrete phases, said lacquers being capable of yielding clear films. Various other objects and advantages of this invention will be apparent from the description hereinafter presented.

As is well known in the art, it is generally difficult to prepare homogeneous copolymers of vinyl acetate and acrylic comonomers. These difficulties arise as a result of the fact that acrylic monomers are substantially more reactive than vinyl acetate in copolymerization reactions. Consequently, such copolymerizations invariably yield heterogeneous copolymers, particularly when the concentration of the acrylic comonomer is below 50 mole percent and where the polymerization is conducted in an organic solvent solution system. Thus despite protective measures which are taken, such as the slow addition of the more reactive acrylic monomer, the resulting lacquers tend to display considerable haziness and ultimately separate out into discrete phases. Moreover, the films and coatings which may be prepared from such heterogeneous copolymer solutions are cloudy in appearance in contrast to the practically optically clear films which can be prepared from solutions of substantially homogeneous copolymers.

Beta-hydroxyalkyl acrylates are particularly useful as monomers in copolymerization with vinyl acetate. Films, binders and coating derived from these vinyl acetate: hydroxyalkyl acrylate copolymers are found to be especially useful to the practitioner. For example, the primary hydroxyl groups in hydroxyethyl acrylate: vinyl acetate provide loci for cross-linking the copolymer. Cross-linking may be accomplished by the use of various cross-linking agents and/or by the application of a sufficient degree of heat. In addition, these copolymers may be alcoholyzed or hydrolyzed and thereby converted into vinyl alcohol: hydroxyalkyl acrylate copolymers which provide the practitioner with many useful properties as is noted in a copending patent application entitled, "Novel Copolymers," having Serial Number 168,306, filed January 17, 1962 and assigned to the assignee of the subject application.

Unfortunately, the above-mentioned heterogeneity, encountered in the copolymerization of arcylate monomers and vinyl acetate, is a particularly serious problem when the acrylate is a beta-hydroxyalkyl acrylate; especially since the latter monomers need be present in these vinyl acetate copolymers in concentrations which are generally only 50 mole percent, or less, in order to obtain the full benefit of their advantageous properties. Thus, their use in such low concentrations thereby promotes the lack of homogeneity of the resulting copolymers.

I have now discovered a method for copolymerizing vinyl acetate and the lower hydroxyalkyl acrylate esters which produces a homogeneous copolymer, said method being fully operable under conditions wherein the acrylate esters are present in concentrations as low as ten mole percent, as well as where the polymerization is conducted in an organic solvent solution system.

In brief, the process of my invention involves the preparation of vinyl acetate: hydroxyalkyl acrylate copolymers by means of a procedure which comprises the use of crotonic acid, or certain derivatives of the latter, as a "coupling monomer." I have found that the inclusion, in the polymerization reaction, of crotonic acid, or one of its subsequently described derivatives, achieves the surprising result of facilitating the copolymerization of the vinyl acetate and the hydroxyalkyl acrylate ester to produce a homogeneous polymeric product; the resulting polymer comprising a vinyl acetate: hydroxyalkyl acrylate ester: crotonic acid terpolymer. The unique "coupling action" on the part of crotonic acid, or its equivalents, is indeed surprising. For, although crotonic acid is known to readily copolymerize with vinyl acetate, its reactivity with acrylic comonomers, on the other hand, is known to be extremely sluggish. Its successful application in the process of my invention is, therefore, most unexpected.

The lower hydroxyalkyl acrylates which are useful in the process of my invention are hydroxyethyl, hydroxypropyl, and hydroxybutyl acrylate, i.e. hydroxyalkyl acrylates wherein the alkyl group contains from 2 to 4 carbon atoms.

As for the crotonic acid derivatives which are equivalent to crotonic acid in its action, one may employ alkyl esters of crotonic acid wherein said alkyl group may contain from one to eight carbon atoms. Such alkyl esters include methyl, ethyl, propyl, butyl, pentyl, hexyl, heptyl, and octyl crotonate. In addition, one may also employ hydroxyalkyl esters of crotonic acid wherein the alkyl group of said esters may contain from two to four carbon atoms. Said hydroxyalkyl crotonate esters include hydroxyethyl, hydroxypropyl, and hydroxybutyl crotonate.

Although the subsequent description of the process of my invention will be given, for the most part, in terms of the use therein of crotonic acid, it is of course to be understood that any of the above-described crotonic acid esters are fully equivalent to crotonic acid for purposes of this invention.

With respect to proportions, the terpolymers resulting from the process of my invention may contain from about 85 to 49 mole percent of vinyl acetate, from about 10 to 50 mole percent of one or more of the above described lower hydroxyalkyl acrylate esters, and from about 1 to 5 mole percent of crotonic acid or one of the above-described crotonic acid esters. One or more of the "coupling monomers" may be used, though there is no apparent advantage in utilizing a plurality of the coupling monomers.

The terpolymers of this invention may be prepared by means of bulk polymerization and, more preferably, by means of organic solvent solution polymerization techniques.

In preparing these terpolymers in bulk form, the procedure generally involves heating, under reflux and with agitation, a mixture of the respective monomers in the presence of about 0.1 to 1.5%, as based upon the total weight of the monomer charge, of a monomer-soluble, free-radical initiating catalyst. The catalyst used may be either an organic peroxide, such as benzoyl peroxide, or an azo type such as azodiisobutyronitrile. The temperature of the bulk polymerizations is generally at, or near the boiling point of vinyl acetate, viz. 72° C.

In the preferred organic solvent solution technique, the procedure generally involves heating, under reflux and with agitation of about a 40 to 75%, by weight, organic solvent solution of the respective monomers in the presence of a solvent-soluble, free-radical initiating catalyst. It is possible to utilize any solvent in which the monomers as well as the ultimate terpolymers will be soluble. Such solvents include acetone, methyl ethyl ketone, ethyl acetate and various alcohols such as methanol and ethanol.

The catalyst used for the polymerization may be either an organic peroxide, such as benzoyl peroxide; or, an azo type such as azodiisobutyronitrile. These catalysts may be present in a concentration which may range from about 0.1 to 3.0%, as based upon the total weight of the monomer charge. The polymerization temperature will depend upon the solvent used and on whether the polymerization is conducted under reflux or vacuum; and will generally vary from about 50° to 80° C. Optimum results are obtained by utilizing a so-called "slow addition" technique wherein the hydroxyalkyl acrylate ester is slowly added, in small portions, during the course of the polymerization, thereby further facilitating the formation of homogeneous terpolymers. The total resin solids content of the resulting lacquers should be in the range of about 25 to 65%, by weight.

In any event, the resulting terpolymer lacquers will be characterized by their homogeneity as is evidenced by their haze-free clarity as well as by the complete absence of any subsequent formation of discrete phases. As noted earlier, these lacquers may be used in alcoholysis reactions for the preparation of vinyl alcohol-hydroxyalkyl acrylate-crotonic acid copolymers; or they may be employed as binders and in the formation of films and coatings. In the case of the hydroxyethyl acrylate terpolymers, the primary hydroxy groups facilitate their subsequent cross-linking into thermoset polymers.

The actual preparation of coatings from my polymer lacquers may be accomplished by means of any of the usual techniques well known to those skilled in the art. Useful coatings may be cast upon a variety of substrates including paper, wood, metal, cloth, and synthetic plastics which may be either in the form of films or solid masses.

As noted above, those terpolymers of my invention containing hydroxyethyl acrylate, as the hydroxyalkyl acrylate comonomer, may be readily cross-linked because of the presence therein of primary hydroxyl groups. Such cross-linking may be achieved either on prolonged aging or by the application of moderate heating such as, for example, ten minutes at 130° C., and/or by formulation with cross-linking agents or catalysts. Such cross-linking agents include aldehydes such as glyoxal, and furfural aldehyde; non-polymeric cyclic urea compounds such as dimethylol ethylene urea; non-polymeric urea-formaldehyde condensates such as dimethylol urea; non-polymeric phenol-formaldehyde condensates such as trimethylol phenol; and non-polymeric melamine-formaldehyde condensates such as trimethylol melamine. Acidic catalysts including non-oxidizing inorganic acids such as phosphoric and hydrochloric acids; non-volatile organic acids such as oxalic, fumaric and para-toluene sulfonic acids; and, acidic salts such as chromic nitrate, zinc nitrate, chromic chloride, ammonium chloride, aluminum chloride, zinc nitrate, amomnium dichromate, ferric chloride, and stearato chromic chloride may be used to promote the cross-linking reaction. It should be noted that it is possible to use these acidic catalysts either alone or in combination with any of the above-listed aldehyde or condensate type cross-linking agents and vice versa.

Depending upon the particular cross-linking agent used, they are formulated with the hydroxyethyl acrylate terpolymer lacquers in amounts ranging from about 0.2 to 20.0%, as based upon the weight of the terpolymer resin solids.

Where desired by the practitioner it is possible to convert many of the terpolymer lacquers as prepared by means of the above-described polymerization technique, into aqueous emulsions. This may be accomplished by adding water to the agitated lacquer while either simultaneously or subsequently removing the organic solvent by means of a distillation procedure. Such emulsions will be found to be highly stable as a result of the presence of the hydroxyl groups on the terpolymer chain. These hydroxyl groups, in effect, serving as stabilizing sites to maintain emulsion.

The following examples will further illustrate the embodiment of my invention. In these examples, all parts given are by weight unless otherwise noted.

EXAMPLE I

The examples illustrate the preparation of the novel terpolymers of my invention. In this example, the product prepared was an organic solvent solution of a vinyl acetate: hydroxyethyl acrylate: crotonic acid terpolymer having a mole percent ratio of 85:10:5. Also, illustrated are various means of cross-linking the terpolymers.

*Part 1.*—The following ingredients were added to a reaction vessel equipped with means for mechanical agitation, a water cooled condenser, a thermometer, and a slow addition funnel:

| | Parts |
|---|---|
| Vinyl acetate | 74.0 |
| Crotonic acid | 4.3 |
| Ethyl alcohol | 55.0 |
| Benzoyl peroxide | 0.8 |

The above charge was stirred and brought to reflux at 75° C. by heating on a water bath. The slow addition of 11.6 parts of hydroxyethyl acrylate was then initiated and continued, at a uniform rate, over a period of 3 hours. Reflux was maintained for an additional 6 hours whereupon another 35 parts of ethyl alcohol were added and the charge thereupon cooled to room temperature and removed from the reaction vessel. The resultant terpolymer lacquer had a resin solids content of 47%, by weight. This lacquer was perfectly clear and samples which were maintained for periods of as long as 6 months retained perfect homogeneity as was evidenced by the complete absence of the formation of discrete phases. Moreover, the films cast from this lacquer were clear and free of cloudiness which would have been indicative of a heterogeneous polymer.

*Part 2.*—To illustrate the manner in which hydroxyethyl acrylate containing terpolymer may be cross-linked, films from a sample of the lacquer were cast at a wet thickness of 6 mils and subsequently heated for 30 minutes at a temperature of 130° C. Additional samples of this lacquer were formulated with various cross-linking agents whereupon comparable films were cast from each of the formulated samples; the films, in this case, being air dried for about 24 hours at a temperature of 72° F. It was noted that both the baked film as well as the films prepared from the lacquer samples containing the cross-linking agents were all effectively cross-linked as was evidenced by their almost total insolubility in acetone. In contrast, the uncross-linked films prepared from this lacquer were completely soluble in acetone.

The following table lists the various cross-linking agents used as well as the concentration at which they were each applied.

| Cross-linking agent or catalyst: | Concentration (percent based on resin solids) |
|---|---|
| Hydrochloric acid | 0.2 |
| Glyoxal [1] | 5.0 |
| Dimethylol ethylene urea [1] | 15.0 |
| Dimethylol urea [1] | 8.0 |
| Trimethylol melamine [1] | 20.0 |
| Trimethylol phenol [1] | 18.0 |
| Para-toluene sulfonic acid | 1.0 |

[1] Films containing these cross-linking agents were baked for ½ hours at 130° C.

Table I shows the composition of three terpolymer lacquers prepared by means of the procedure described in Part 1 of Example I. In each case, the resulting terpolymers were completely homogeneous as was evidenced by the absence of any phasing in the respective lacquers as well as by the clarity of the films which were cast therefrom.

*Table I*

[Copolymer composition in mole percent]

| Copolymer No. | Vinyl acetate | Hydroxy-ethyl acrylate | Hydroxy-propyl acrylate | Hydroxy-butyl acrylate | Crotonic acid |
|---|---|---|---|---|---|
| 1 | 85 | | | 10 | 5 |
| 2 | 63 | | 35 | | 2 |
| 3 | 49 | 50 | | | 1 |

Table II illustrates the unsatisfactory results obtained when an attempt was made to prepare a series of vinyl acetate: hydroxypropyl acrylate copolymers by means of a technique which did not involve the use of crotonic acid, or an equivalent, as a coupling comonomer.

Table II shows the composition of two vinyl acetate: hydroxypropyl acrylate copolymer lacquers prepared by means of the procedure described in Part 1 of Example I with the exception that crotonic acid was not present in the respective polymerization medium. In each case the resulting copolymers were heterogeneous in character as was evidenced by the appearance, in the lacquers, of discrete phases within a period of only 24 hours, as well as by the extreme cloudiness of the films which were cast from these lacquers.

*Table II*

[Copolymer composition in mole percent]

| Copolymer No. | Vinyl acetate | Hydroxypropyl acrylate |
|---|---|---|
| 1 | 85 | 15 |
| 2 | 90 | 10 |

EXAMPLE II

This example illustrates the preparation of vinyl acetate: hydroxypropyl acrylate copolymers using various hydroxyalkyl and alkyl esters of crotonic acid as the coupling comonomers.

*Part 1.*—In three repetitions of the procedure described in Part 1 of Example I, there were prepared vinyl acetate: hydroxypropyl acrylate:hydroxyalkyl crotonate terpolymers each having a mole percent ratio of 85:10:5 and wherein the hydroxyalkyl crotonates utilized were, respectively, hydroxyethyl, hydroxypropyl, and hydroxybutyl crotonate. In each case, the resulting terpolymers were completely homogeneous as was evidenced by the absence of any phasing within the respective lacquers, as well as by the clarity of the films which were cast therefrom.

*Part 2.*—Table III illustrates the preparation of vinyl acetate: hydroxypropyl acrylate copolymers using various alkyl esters of crotonic acid as the coupling monomers.

The terpolymers of Table III were prepared by means of the procedure described in Part 1 of Example I. In each case the resulting terpolymers were completely homogeneous as was evidenced by the absence of any phasing within the respective lacquers as well as by the outstanding clarity of the films which were cast therefrom.

*Table III*

[Copolymer composition in mole percent]

| Copolymer No. | Hydroxy-propyl acrylate | Methyl crotonate | Butyl crotonate | Octyl crotonate | Vinyl acetate |
|---|---|---|---|---|---|
| 1 | 40.0 | 3.0 | | | 57.0 |
| 2 | 35.0 | | 4.5 | | 60.5 |
| 3 | 20.0 | | | 5.0 | 75.0 |

EXAMPLE III

This example illustrates the preparation of the terpolymers of my invention by means of a bulk polymerization technique. In this case, the product prepared was a vinyl acetate:hydroxybutyl acrylate:butyl crotonate terpolymer having a mole percent ratio of 45:50:5.

This following ingredients were added to reaction vessel equipped with means for mechanical agitation, a water cooled condenser, and a slow addition funnel:

| | Parts |
|---|---|
| Vinyl acetate | 38.7 |
| Butyl crotonate | 7.2 |
| Benzoyl peroxide | 0.25 |

The above charge was stirred and brought to reflux at 72° C. by heating on a water bath. The slow addition of 71 parts of hydroxybutyl acrylate was then initiated and continued, at a uniform rate, over a period of 1½ hours. As the reaction proceeded, the charge slowly thickened while, at the same time, the reflux temperature began to rise. Upon rising to 94° C. reflux terminated, indicating the completion of the reaction whereupon the hot polymer was immediately discharged into an aluminum container. The resulting product was essentially a 100% solid terpolymer which was very soft and clear in appearance. A portion of this solid product was dissolved in sufficient methanol to prepare a 40%, by weight, lacquer. The homogeneity of the terpolymer was evidenced by the absence of any phasing as well as by the outstanding clarity of the tacky films which were cast therefrom.

Summarizing, the novel process of my invention is thus seen to provide for the preparation of homogeneous vinyl acetate: hydroxyalkyl acrylate copolymers by utilizing crotonic acid, or various ester equivalents thereof, as coupling monomers. Variations may be made in procedures, proportions, and materials without departing from the scope of this invention as defined by the following claims.

I claim:

1. The process of preparing homogeneous, random terpolymers of vinyl acetate, the lower hydroxyalkyl acrylates, and a coupling monomer comprising reacting a mixture containing from 85 to 49 mol percent of vinyl acetate, from 10 to 50 mol percent of a lower hydroxyalkyl acrylate and from 1 to 5 mol percent of a coupling monomer selected from the group consisting of crotonic acid, alkyl esters of crotonic acid wherein the alkyl group of said esters contains from 1 to 8 carbon atoms, and hydroxyalkyl esters of crotonic acid wherein the alkyl group of said esters contains from 2 to 4 carbon atoms.

2. The process of preparing homogeneous, random terpolymers of vinyl acetate, the lower hydroxyalkyl acrylates, and a coupling monomer comprising reacting a mixture containing from 85 to 49 mol percent of vinyl acetate, from 10 to 50 mol percent of a lower hydroxyalkyl acrylate and from 1 to 5 mol percent of a coupling monomer selected from the group consisting of crotonic acid, alkyl esters of crotonic acid wherein the alkyl group of said esters contains from 1 to 8 carbon atoms, and hydroxylalkyl esters of crotonic acid wherein the alkyl group of said esters contains from 2 to 4 carbon atoms, the heating of said mixture being conducted in the presence of a free-radical initiating catalyst and terminating said heating upon the completion of the resulting polymerization reaction.

3. The process of claim 2, wherein the vinyl acetate, the lower hydroxyalkyl acrylate monomer and free-radical initating catalyst are dissolved in an organic solvent in which the resulting copolymer is also soluble.

4. The process of claim 2, wherein the alkyl group of said hydroxyalkyl acrylate contains from 2 to 4 carbon atoms.

5. The process of claim 2, wherein during the course of the polymerization reaction the lower hydroxyalkyl acrylate is slowly added.

6. A new composition of matter comprising a random terpolymer of from 85 to 49 mole percent of vinyl acetate, from 10 to 50 mole percent of at least one lower hydroxyalkyl acrylate and from 1 to 5 mole percent of at least one of a third comonomer selected from the group consisting of crotonic acid, alkyl esters of crotonic acid wherein the alkyl group of said esters contains from 1 to 8 carbon atoms, and hydroxyalkyl esters of crotonic acid wherein the alkyl group of said esters contains from 2 to 4 carbon atoms.

7. The terpolymer of claim 6, wherein the latter is dissolved in an organic solvent.

8. The terpolymer of claim 6, wherein the alkyl group of said hydroxyalkyl acrylate contains from 2 to 4 carbon atoms.

9. A composition comprising an organic solvent solution of a random terpolymer containing from 85 to 49 mole percent of vinyl acetate, from 10 to 50 mole percent of a lower hydroxyalkyl acrylate wherein the alkyl group of said ester contains from 2 to 4 carbon atoms, and from 1 to 5 mole percent of a monomer selected from the group consisting of crotonic acid, alkyl esters of crotonic acid wherein the alkyl group of said esters contains from 1 to 8 carbon atoms, and hydroxyalkyl esters of crotonic acid wherein the alkyl group of said esters contains from 2 to 4 carbon atoms.

10. A film comprising the dried, consolidated residue of the organic solvent solution of claim 9.

11. A substrate coated with the dried, consolidated residue of the organic solvent solution of claim 9.

12. A film comprising the dried, cross-linked, consolidated residue of an organic solvent solution of a random terpolymer containing from 85 to 49 mole percent of vinyl acetate, from 10 to 50 mole percent of hydroxyethyl acrylate, and from 1 to 5 mole percent of a monomer selected from the group consisting of crotonic acid, alkyl esters of crotonic acid wherein the alkyl group of said esters contains from 1 to 8 carbon atoms, and hydroxyalkyl esters of crotonic acid wherein the alkyl group of said esters contains from 2 to 4 carbon atoms.

13. The film of claim 12, wherein the latter has been cross-linked by heating.

14. The film of claim 12, wherein the latter has been cross-linked by the action of a cross-linking agent present in said organic solvent terpolymer solution in a concentration ranging from about 0.2 to 20.0%, as based upon the weight of said copolymer resin solids, said cross-linking agent being selected from among the group consisting of aldehydes, non-polymeric cyclic urea compounds; non-polymeric urea-formaldehyde condensates; non-polymeric phenol-formaldehyde condensates; non-polymeric melamine-formaldehyde condensates; non-oxidizing inorganic acids; non-volatile organic acids; and, acidic salts.

15. A composition comprising an aqueous emulsion of a random terpolymer containing from 85 to 49 mole percent of vinyl acetate, from 10 to 50 mole percent of a lower hydroxyalkyl acrylate wherein the alkyl group of said ester contains from 2 to 4 carbon atoms, and from 1 to 5 mole percent of a monomer selected from the group consisting of crotonic acid, alkyl esters of crotonic acid wherein the alkyl group of said esters contains from 1 to 8 carbon atoms, and hydroxyalkyl esters of crotonic acid wherein the alkyl group of said esters contains from 2 to 4 carbon atoms.

References Cited by the Examiner

UNITED STATES PATENTS

| | | | |
|---|---|---|---|
| 2,681,897 | 6/54 | Frazier | 260—78.5 |
| 3,002,959 | 10/61 | Hicks | 260—85.7 |

JOSEPH L. SCHOFER, *Primary Examiner.*